(12) United States Patent
Miedema et al.

(10) Patent No.: US 11,356,525 B2
(45) Date of Patent: Jun. 7, 2022

(54) MANAGING A DISTRIBUTED MICROSERVICE ARCHITECTURE AS A MONOLITHIC DISTRIBUTION

(71) Applicant: Ciena Corporation, Hanover, MD (US)

(72) Inventors: David Miedema, Ottawa (CA); Bruno Doyle, Ottawa (CA); Elaheh Askari, Nepean (CA); Roman Romaniuk, Ottawa (CA)

(73) Assignee: Ciena Corporation, Hanover, MD (US)

( * ) Notice: Subject to any disclaimer, the term of this patent is extended or adjusted under 35 U.S.C. 154(b) by 370 days.

(21) Appl. No.: 16/561,230

(22) Filed: Sep. 5, 2019

(65) Prior Publication Data

US 2021/0075877 A1   Mar. 11, 2021

(51) Int. Cl.
*H04L 29/08* (2006.01)
*H04L 67/562* (2022.01)
*H04L 67/51* (2022.01)
*H04L 67/567* (2022.01)
*H04L 67/01* (2022.01)
*H04L 67/288* (2022.01)
*H04L 67/63* (2022.01)
*H04L 67/53* (2022.01)

(52) U.S. Cl.
CPC .......... *H04L 67/2809* (2013.01); *H04L 67/16* (2013.01); *H04L 67/20* (2013.01); *H04L 67/288* (2013.01); *H04L 67/2838* (2013.01); *H04L 67/327* (2013.01); *H04L 67/42* (2013.01)

(58) Field of Classification Search
CPC ..... H04L 67/2809; H04L 67/16; H04L 67/20; H04L 67/2838; H04L 67/327; H04L 67/42
USPC ........................................................ 709/227
See application file for complete search history.

(56) References Cited

U.S. PATENT DOCUMENTS

2007/0112574 A1* 5/2007 Greene ............... H04W 12/122
                                                       340/572.1
2020/0341876 A1* 10/2020 Gandhi ............... H04L 67/1095

* cited by examiner

*Primary Examiner* — Sibte H Bukhari
(74) *Attorney, Agent, or Firm* — Clements Bernard Baratta; Lawrence A. Baratta, Jr.; Christopher L. Bernard

(57) ABSTRACT

Systems and methods for implementing a service broker that is an orchestration layer for transactions in a distributed microservice system include receiving a provisioning request in the distributed microservice system, wherein the provisioning request is redirected to the service broker, and wherein the distributed microservice system includes a plurality of microservices each managing its own data such that there is no central configuration store for the plurality of microservices; and managing the plurality of microservices by the service broker as a monolith in context of the provisioning request to perform detecting, validating, and one of committing and canceling changes in the distributed microservice system due to the provisioning request.

15 Claims, 2 Drawing Sheets

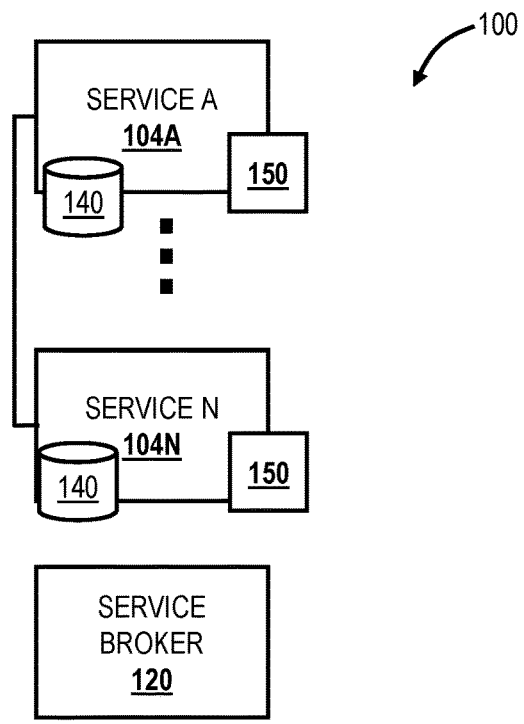

RECEIVING A PROVISIONING REQUEST IN THE DISTRIBUTED MICROSERVICE SYSTEM, WHEREIN THE PROVISIONING REQUEST IS REDIRECTED TO THE SERVICE BROKER, AND WHEREIN THE DISTRIBUTED MICROSERVICE SYSTEM INCLUDES A PLURALITY OF MICROSERVICES EACH MANAGING ITS OWN DATA SUCH THAT THERE IS NO CENTRAL CONFIGURATION STORE FOR THE PLURALITY OF MICROSERVICES — S1

MANAGING THE PLURALITY OF MICROSERVICES BY THE SERVICE BROKER AS A MONOLITH IN CONTEXT OF THE PROVISIONING REQUEST TO PERFORM DETECTING, VALIDATING, AND ONE OF COMMITTING AND CANCELING CHANGES IN THE DISTRIBUTED MICROSERVICE SYSTEM DUE TO THE PROVISIONING REQUEST — S2

MANAGING A DISTRIBUTED MICROSERVICE ARCHITECTURE AS A MONOLITHIC DISTRIBUTION

FIELD OF THE DISCLOSURE

The present disclosure generally relates to computing, namely distributed microservices. More particularly, the present disclosure relates to systems and methods for managing a distributed microservice architecture as a monolithic distribution.

BACKGROUND OF THE DISCLOSURE

A Service-Oriented Architecture (SOA) is an approach in software design in which application components provide services to other components via a communications protocol. The principles of service-orientation are independent of any vendor, product, or technology. A service is a self-contained unit of functionality, and services can be combined to provide the functionality of a large software application. A processing device can run any number of services, and each service is built in a way that ensures that the service can exchange information with any other service. Microservices are a variant of SOA used to build distributed software systems. Similar to SOA, services in a Microservice Architecture (MSA) are processes that communicate with each other over the network in order to fulfill an objective, and these services use technology-agnostic protocols. In a Microservice Architecture, services should be small, and the protocols should be lightweight. The benefit of distributing different responsibilities of the system into different smaller services is that it enhances the cohesion and decreases the coupling. This makes it much easier to change and add functions and qualities to the system anytime. One example of a distributed software system that uses services is a network element in a telecommunications network, e.g., an optical network element, router, switch, etc.

A distributed microservice architecture is a system in which microservices can be deployed to run independently and distributed across a set of processors. Each microservice is responsible for managing its own data, and the data ownership model can be distributed across many microservices. This architecture does not dictate any specific database solution to manage this configuration data. In fact, configuration data in one microservice may be translated and stored in storage owned by a completely different internal microservice.

Current systems allow transactional support across distributed systems, but in all cases, the client must have detailed knowledge of the services it is communicating with. In a network-wide deployment, a channel being set up across multiple devices needs to talk to each device and manage the transaction at the network level. This is satisfactory since the network has been designed with the components in mind. In cases where the details of the implementation are abstracted from the controller, there is a need for a separate hand-crafted orchestrator, i.e., described herein as a service broker, to manage transactions across granular services.

BRIEF SUMMARY OF THE DISCLOSURE

In an embodiment, a non-transitory computer-readable storage medium includes instructions stored thereon, the instructions provide a service broker that is an orchestration layer for transactions in a distributed microservice system. The instructions, when executed, cause one or more processors to perform the steps of receiving a provisioning request in the distributed microservice system, wherein the provisioning request is redirected to the service broker, and wherein the distributed microservice system includes a plurality of microservices each managing its own data such that there is no central configuration store for the plurality of microservices; and managing the plurality of microservices by the service broker as a monolith in context of the provisioning request to perform detecting, validating, and one of committing and canceling changes in the distributed microservice system due to the provisioning request. The provisioning request can be for a transaction that spans multiple microservices of the plurality of microservices. The monolith can include the service broker temporarily managing the data of each of the plurality of microservices. The service broker can include a library in each microservice, configured to redirect the provisioning request to a local service broker. The service broker can be a global service broker for all of the plurality of microservices in the distributed microservice system. The provisioning request can be a first request for a transaction, and wherein subsequent requests for the transaction are managed internally by the service broker. The instructions, when executed, can further cause one or more processors to perform the steps of constructing a temporary monolithic database of data in respective microservices for the managing; and destroying the temporary monolithic database subsequent to completion of the transaction.

In another embodiment, a distributed microservices system includes a plurality of microservices each executed on one or more processing devices, wherein each microservice manages its own data such that there is no central configuration store for the plurality of microservices; and a service broker configured to operate as an orchestration layer for transactions in the distributed microservice system, wherein the service broker is configured to receive a redirected provisioning request, and manage the plurality of microservices by the service broker as a monolith in context of the provisioning request to perform detection, validation, and one of commit and cancel changes in the distributed microservice system due to the provisioning request.

In a further embodiment, a method, for implementing a service broker that is an orchestration layer for transactions in a distributed microservice system, includes receiving a provisioning request in the distributed microservice system, wherein the provisioning request is redirected to the service broker, and wherein the distributed microservice system includes a plurality of microservices each managing its own data such that there is no central configuration store for the plurality of microservices; and managing the plurality of microservices by the service broker as a monolith in context of the provisioning request to perform detecting, validating, and one of committing and canceling changes in the distributed microservice system due to the provisioning request.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of the distributed microservice system illustrating an example service broker architecture; and FIG. 4 is a flowchart of a service broker process.

DETAILED DESCRIPTION OF THE DISCLOSURE

The present disclosure relates to systems and methods for managing a distributed microservice architecture as a monolithic distribution. The present disclosure introduces the concept of a service that can act as an orchestration layer for transactions in a distributed microservice system. This function allows external applications to be hidden from the complexities of the implementation and allows for flexibility in the way the implementation can be deployed without changing external requests. It also allows for the external users to make simple transactional requests at any layer (network, device, component) and have the coordination actions take place internal to the system.

The present disclosure allows distributed microservice systems to be used for their ability to decouple, enforce programming boundaries, and allow flexible deployments, while still providing an external view that appears centralized and homogeneous to the outside user. This is the "best of both worlds" from a programming perspective, and from a manageability perspective. The present disclosure allows a distributed microservice architecture, in which each service owns its own data, and there is no central config store for all services, to be managed as if there was one central data store for all transactional requests. It allows transactions to span multiple services without locking all services in the deployment, it supports both optimistic and pessimistic concurrency models, it supports staging and validation for any request, and it supports implicit transactions where transaction operations are all issued together from the broker atomically. The present disclosure supports explicit transactions in which the operations are invoked directly from the client, and the service broker is simply providing a broker function to find and manage the services involved in the transaction (since the client will not know this information).

Example Distributed Microservice System

Figure 1:
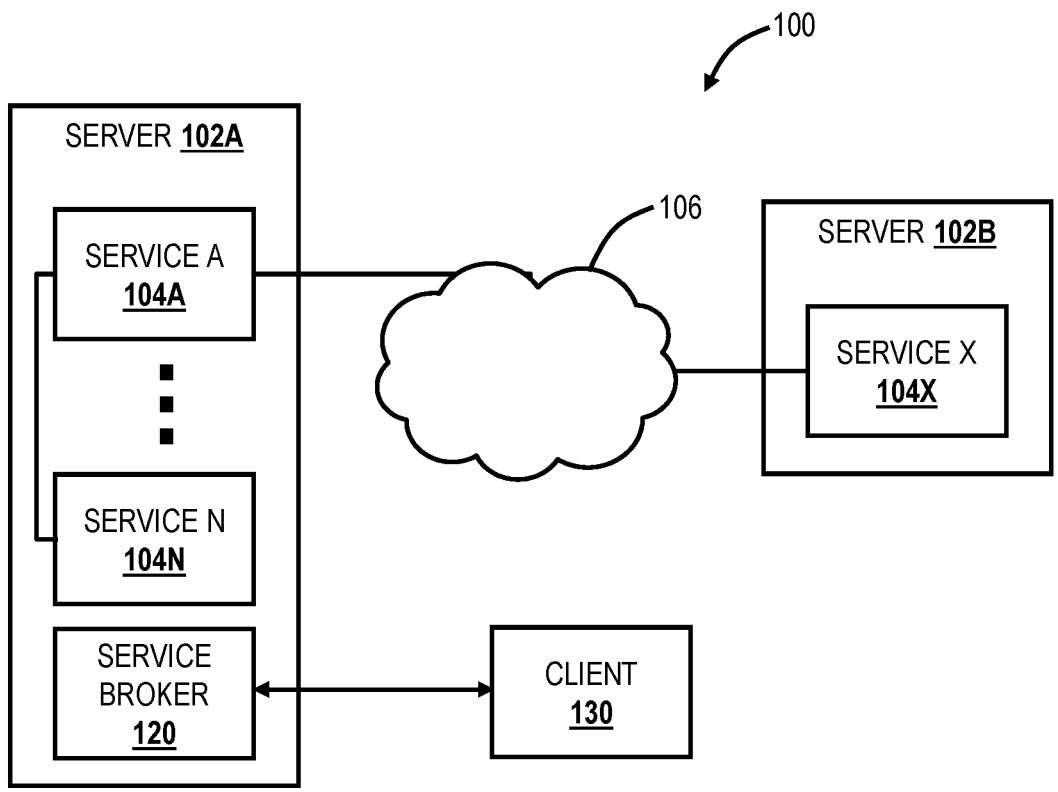
FIG. 1 is a network diagram of a distributed microservice system with two example servers executing example microservices.

FIG. 1 is a network diagram of a distributed microservice system 100 with two example servers 102A, 102B executing example microservices 104A, 104N, 104X. In this example, the server 102A executes the microservices 104A, 104N, and the server 102B executes the microservice 104X. The servers 102A, 102B are communicatively coupled to one another over a network 106. The network 106 can be a Local Area Network (LAN), a wireless LAN (WLAN), a Wide Area Network (WAN), a data center network, the Internet, any other type of network, and a combination thereof. The servers 102A, 102B can be physical servers in racks, Virtual Machines (VM), blades, or the like. The distributed microservice system 100 is an example of distributed microservice systems. Those skilled in the art will appreciate other types of implementations are also contemplated, including ones where the servers 102 are collocated and communicate over physical links such as a backplane, traces, etc.

The microservices 104A, 104N, 104X can be microservices or any other type of service in an SOA. The microservices 104A, 104N, 104X are each a self-contained unit of functionality, and each can communicate with one another. The microservices 104A, 104N, 104X can be organized around their capabilities. The microservices 104A, 104N, 104X can be implemented using different programming languages, databases, hardware and software environment, etc. The microservices 104A, 104N, 104X can be viewed as a producer-consumer where one service makes requests from another, using communication techniques.

Again, the distributed microservice system 100 is a system in which microservices 104A, 104N, 104X can be deployed to run independently and distributed across a set of processors in the servers 102A, 102B. Each microservice 104A, 104N, 104X is responsible for managing its own data, and the data ownership model can be distributed across many microservices 104A, 104N, 104X. This architecture does not dictate any specific database solution to manage this configuration data. In fact, configuration data in one microservice 104A, 104N, 104X may be translated and stored in storage owned by a completely different internal microservice 104A, 104N, 104X.

However, when the distributed microservice system 100 is constructed of multiple microservices 104A, 104N, 104X, the details of this architecture may need to be hidden from the end-user. Many configuration protocols (Network Configuration Protocol (NETCONF), Representational State Transfer (REST), Remote Procedure Calls (gRPC), Command Line Interface (CLI), etc.) make assumptions that the entire device is managed as a single entity. One major requirement is that the system 100 can perform edit operations as a transaction that can be validated, committed, and/or canceled. This abstraction simplifies the control layer but pushes the complexity of presenting a disaggregated set of services as a single entity in a given deployment.

For example, the following table illustrates interface configuration requirements for example configuration protocols:

| Protocol | Interface configuration requirements |
| --- | --- |
| REST | single edit action is validated and committed support for replace or merge |
| CLI | individual edits can be made piecemeal bulk updates can be performed in config mode and validated or discarded before being committed |
| NETCONF | writable-running support involves direct updates to running configuration rollback-on-error required atomicity candidate supports multiple updates in a sandbox that can be validated and committed or canceled replace operations supported for declarative configuration |
| gRPC | replace operations for declarative configuration update operations for merging no candidate configuration |

The collection of microservices 104A, 104N, 104X must behave and perform as if they are a single unit even if internally, there are many different services and datastores distributed internally. A key assumption of interfaces such as these is that the configuration data is centrally available to be queried, locked, edited, validated, committed, canceled, and unlocked. In a distributed microservice system 100, this is not the case, and it is not desirable for the distributed microservice system 100 to be forced into a centralized data ownership model simply to support the expectations of these interfaces.

There is, therefore, the requirement for a service broker 120 functions in the distributed microservice system 100 that can hide the complexities of the distributed architecture when requests are being performed externally.

Example Server

Figure 2:
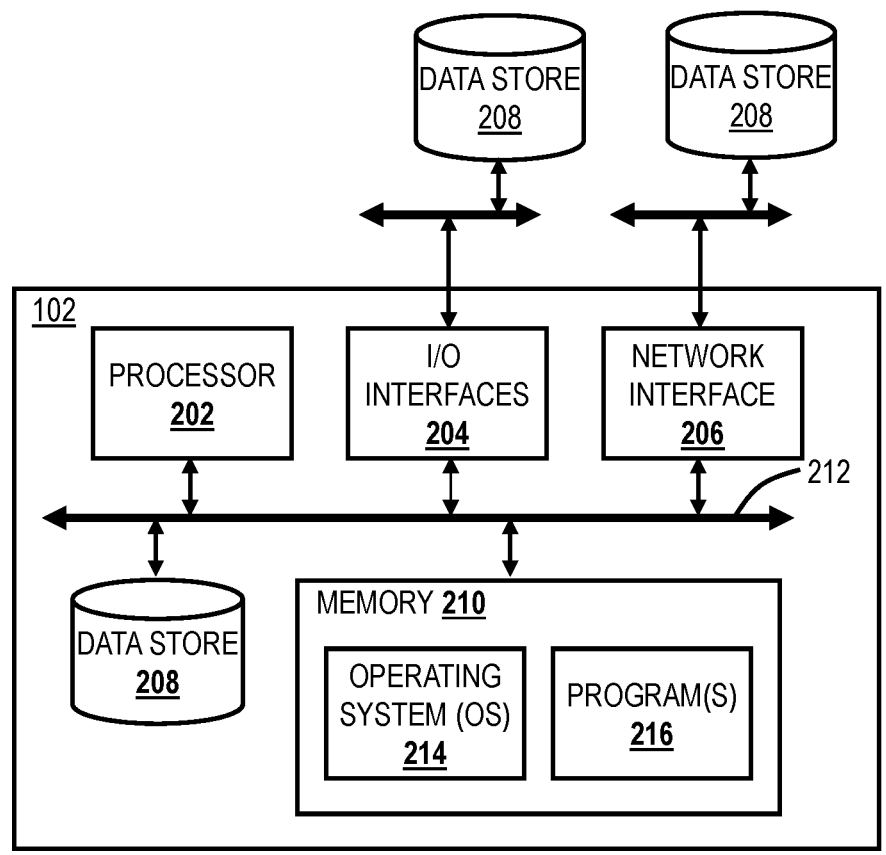
FIG. 2 is a block diagram of an example implementation of the server used for the distributed microservice system.

FIG. 2 is a block diagram of an example implementation of the server 102. The server 102 can be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 102 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 can include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the server 102, a semiconductor-based microprocessor (in the form of a microchip or chipset), or generally any device for executing software instructions. When the server 102 is in operation, the processor 202 is configured to execute software stored within the memory 210, to communicate data to and from the memory 210, and to generally control operations of the server 102 pursuant to the software instructions. The I/O interfaces 204 can be used to receive user input from and/or for providing system output to one or more devices or components. User input can be provided via, for example, a keyboard, touchpad, and/or a mouse. System output can be provided via a display device and a printer (not shown). I/O interfaces 204 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 can be used to enable the server 102 to communicate on a network. The network interface 206 can include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 can include address, control, and/or data connections to enable appropriate communications on the network. A data store 208 can be used to store data. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. In one example, the data store 208 can be located internal to the server 102 such as, for example, an internal hard drive connected to the local interface 212 in the server 102. Additionally, in another embodiment, the data store 208 can be located external to the server 102 such as, for example, an external hard drive connected to the I/O interfaces 304 (e.g., SCSI or USB connection). In a further embodiment, the data store 208 can be connected to the server 102 through a network, such as, for example, a network-attached file server.

The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 can incorporate electronic, magnetic, optical, and/or other types of storage media. Note that the memory 210 can have a distributed architecture, where various components are situated remotely from one another, but can be accessed by the processor 202. The software in memory 210 can include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. The microservices 104 can be instructions in the memory 210 and/or the data store 208 which are executed by the processor 202.

Service Broker

The service broker 120 provides functionality in the distributed microservice system 100 for managing a distributed microservice architecture as a monolithic distribution. The service broker 120 can be a microservice 104 or part of a microservice 104 such as a library. The service broker 120 allows the distributed microservice system 100, in which each microservice 104 owns its own data, and there is no central configuration store for all the microservices 104, to be managed as if there was one central data store for all transactional requests. This includes allowing transactions to span multiple microservices 104 without locking all microservices 104 in the deployment. The service broker 120 supports both optimistic and pessimistic concurrency models, staging and validation for any request, and implicit transactions where transaction operations are all issued together from the service broker 120 atomically. The service broker 120 supports explicit transactions in which the operations are invoked directly from a client 130, and the service broker 120 is simply providing a broker function to find and manage the microservices 104 involved in the transaction (since the client 130 will not know this information).

In the distributed microservice system 100, the service broker 120 can be used to detect, validate, and commit or cancel changes to the current configuration of the distributed microservice system 100. In this manner, the distributed microservice system 100 does not utilize a distributed database. Rather, the microservices 104 own their own data. The service broker 120 allows the microservices 104 to be temporarily managed as a monolith in the context of a transaction, that can be initiated from any microservice 104. With the service broker 120, there is no external transaction orchestrator. Rather, any microservice 104 can perform this function, allowing the microservices 104 to validate and stage other data in the context of a larger transaction. This allows microservices 104 to be much more consistent with each other, allowing microservices 104 that are designed with eventual consistency in mind to be able to support Atomicity, Consistency, Isolation, Durability (ACID) transactions.

Also, in the distributed microservice system 100, a declarative configuration ("config") is the mechanism in which edit operations are performed via complete "declarative" database pushes. The entire new state of the device (the distributed microservice system 100) is pushed in one operation, and it is the responsibility of the distributed microservice system 100 to detect, validate, and apply changes in a device-dependent way. The user should not know or care how the distributed microservice system 100 moves to the destination state, only that the requested destination has been validated and accepted.

The configuration validation is performed on the destination state, not the current state. The configuration validation is performed on configurable data in the distributed microservice system 100; it cannot include operational data. The configuration validation must be performed on the whole request to complete where all errors must be reported.

Before an edit operation is started, the distributed microservice system 100 needs to restrict the operation to real changes. In a declarative/replace operation, the destination state may match the source (original state), and no changes may be needed at all. In a merge operation, the validation needs to be performed against the complete destination database, and this destination needs to be constructed. It can also be the case that the merge request matches the running config and that no changes are needed.

Service Broker Architecture

FIG. 3 is a block diagram of the distributed microservice system 100 illustrating an example service broker architecture. Again, each service 104 includes its own internal data 140. The service broker 120 is configured to coordinate the data 140 for multiple services 104 for the purpose of a transaction, such that the distributed microservice system 100 appears as a monolith, i.e., centralized, for the purpose of the transaction only. The service broker 120 itself cannot be associated with any specific service 104 in the system 100. Although it may be tempting to place the service broker with a "north-bound interface" or "external" service, the service broker 120 must be able to do its job even for internal services.

There can be two approaches to supporting the service broker 120 for all internal services 104. First, a library 150 can be included in each service 104 that attaches the service broker 120 to each service 104. Each service 104 can be configured to redirect provisioning requests to the service broker 120. Here, this library approach can be viewed as a local service broker 120. Second, there can be one service broker 120 per deployment, such that all services 104 are configured to redirect their requests. Here, the service broker 120 can be viewed as a global service broker 120.

The first time a processing request is processed, the request is redirected to the service broker 120, and if there is no transaction associated with the processing request, the service broker 120 knows it needs to create one. Once the transaction is created, additional requests to other services 104 can be sent internally. When an internal service 104 receives a request from another service broker 120, it will send it to the local or central service broker 120, this time with the transaction information associated with it. This allows the local or central service broker 120 to know that this is an operation in the context of an existing transaction, and not to create a new transaction. This allows the decentralized architecture to continue to be decentralized but allows the first access point for an operation to act as a central coordinator for the operation until it is completed.

Service Broker Process

FIG. 4 is a flowchart of a service broker process 200. The service broker process 200 can be implemented via the service broker 120 in the distributed microservice system 100, as a method, and/or via non-transitory computer-readable storage medium having instructions stored thereon. The service broker process 200 includes receiving a provisioning request in the distributed microservice system, wherein the provisioning request is redirected to the service broker, and wherein the distributed microservice system includes a plurality of microservices each managing its own data such that there is no central configuration store for the plurality of microservices (step S1); and managing the plurality of microservices by the service broker as a monolith in context of the provisioning request to perform detecting, validating, and one of committing and canceling changes in the distributed microservice system due to the provisioning request (step S2).

The provisioning request can be for a transaction that spans multiple microservices of the plurality of microservices. The monolith includes the service broker temporarily managing the data of each of the plurality of microservices. The service broker can include a library in each microservice, configured to redirect the provisioning request to a local service broker. The service broker can be a global service broker for all of the plurality of microservices in the distributed microservice system. The provisioning request can be the first request for a transaction, and wherein subsequent requests for the transaction are managed internally by the service broker.

A key advantage of the service broker 120 is that the distributed microservice system 100 can maintain distributed data ownership of the data 140 and enforce boundaries. The service broker 120 coordinates database transactions in an ad-hoc way without sharing databases or schemas (causing unwanted linkages). The service broker 120 allows separation of data since the configuration requests are handled via external Application Programming Interfaces (APIs) for each service 104 and not a distributed database. This allows the services 104 to continue to own their own data 140. Doing so breaks the ability to use a distributed database since each service 104 completely owns its own data 140 and there is no way for external services to see the data in the databases of the services 104.

Again, most external protocols like NETCONF or CLI expect that the entire device (i.e., the distributed microservice system 100) is really one single database and does locking, validation, commit, rollback, copy, etc. on the data underneath as if it was one cohesive database. The service broker 120 operates on a per transaction basis, and from any entry point, to create a temporary monolithic construct of a database that the transaction can be performed under and when done, will destroy the data and allow the next service broker based operation to start. Avoiding a shared database allows the microservice boundaries to be maintained. Doing this orchestration automatically and from any entry point means there is no central transaction service to manage in a deployment. The peering nature of the services are maintained, and deploying them in different ways does not force a change in code to keep pace.

In an embodiment, the distributed microservice system 100 is a telecommunications device (e.g., a network element). Microservices, in general, rely on BASE models (eventual consistency) to keep them aligned, but normal telecom interfaces assume all transactions are ACID based (atomic and consistent). The service broker 120 enforces ACID transactions on microservices that are BASE based.

The service broker 120 is a temporary monolithic aggregation of the configuration data in distributed databases that is assembled in the context of a transaction, and is pushed to temporary local sandboxes in each microservice 104 so a staging and validation framework can expand and validate the transaction across all services that are involved and then do the commit. It is not a configured central database that needs to be managed. It is self-assembling for a specific context, and after the transaction is done, the temporary monoliths are discarded. So, this does a refresh to the distributed microservices 104 for the client 130 and also make sure that the transaction is consistent across multiple individual databases.

The service broker 120 is also doing an orchestration function, but it is not coming from a centralized location in the deployment. Any change to any service 104 will cause a local service broker to construct a temporary monolithic transaction across the microservices 104 involved and orchestrate the change.

Service Broker Transactions

Transactions can be implicitly or explicitly supported by the service broker 120. For implicit support, when a provisioning request is made, and the error handling is specified as rollback, the service broker 120 creates a transaction that can be canceled. The changes requested by an edit operation should be validated by validation code prior to the commit or cancel. The validation should be done against only true changes requested. The true changes must be detected by comparing the request to the current configuration state. The current configuration state must be queried from all internal services involved in the request.

The current state does not exist in any database or central location—it is only represented by the service's response to a get-config request. The current configuration of the services involved cannot change while the transaction is being processed. A lock must be available to prevent changes to services while the transaction is being processed. Since set-object calls are free to change hardware without writing to a database, this lock cannot be a database function specifically. It is undesirable to force, require, or expect application designers to write code in the set-object handler to check for locks, so there needs to be a framework mechanism to reject the direct set-object invocation unless it is done as part of the actual commit process The commit of the operation should invoke a set-object call. No validation or "transaction expansion" should occur in the set-object call. The set-object call (as the commit) should only update cache, persistent storage, hardware, or downstream dependent services.

For explicit support, an external client 130 requests an operation that the service broker 120 would normally do implicitly.

Examples of operations for the service broker 120 include creating transaction, locking services, determining all services involved in transaction, performing a get-config of all services involved, applying requested changes to the current config, replacing the current config with requested changes, performing staging operations and adding staged data to transaction, extending services locks and destination databases based on staged data, performing validation of the transaction, committing the transaction, discarding the transaction, and unlocking the services. The lock/unlock mechanisms can also be made to work with optimistic concurrency models (no locking) and pessimistic concurrency models (full locks and partial locks).

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having instructions stored thereon, the instructions providing a service broker that is an orchestration layer for transactions in a distributed microservice system, and the instructions, when executed, cause one or more processors to perform steps of:

receiving a provisioning request in the distributed microservice system, wherein the provisioning request is redirected to the service broker, wherein the distributed microservice system includes a plurality of microservices each managing its own data such that there is no central configuration store for the plurality of microservices, wherein the provisioning request is a first request for a transaction, and wherein subsequent requests for the transaction are managed internally by the service broker, managing the plurality of microservices by the service broker as a monolith in context of the provisioning request to perform detecting, validating, and one of committing and canceling changes in the distributed microservice system due to the provisioning request;

constructing a temporary monolithic database of data in respective microservices for the managing; and destroying the temporary monolithic database subsequent to completion of the transaction.

2. The non-transitory computer-readable storage medium of claim 1, wherein the provisioning request is for a transaction that spans multiple microservices of the plurality of microservices.

3. The non-transitory computer-readable storage medium of claim 1, wherein the monolith includes the service broker temporarily managing the data of each of the plurality of microservices.

4. The non-transitory computer-readable storage medium of claim 1, wherein the service broker includes a library in each microservice, configured to redirect the provisioning request to a local service broker.

5. The non-transitory computer-readable storage medium of claim 1, wherein the service broker is a global service broker for all of the plurality of microservices in the distributed microservice system.

6. A distributed microservices system comprising:

a processor and a memory, further comprising:

a plurality of microservices each executed on one or more processing devices, wherein each microservice manages its own data such that there is no central configuration store for the plurality of microservices; and a service broker, comprising: a processor and a memory, configured to operate as an orchestration layer for transactions in the distributed microservice system, wherein the service broker is configured to receive a redirected provisioning request, wherein the provisioning request is a first request for a transaction, and wherein subsequent requests for the transaction are managed internally by the service broker, and manage the plurality of microservices by the service broker as a monolith in context of the provisioning request to perform detection, validation, and one of commit and cancel changes in the distributed microservice system due to the provisioning request;

to construct a temporary monolithic database of data in respective microservices for the managing;

and destroy the temporary monolithic database subsequent to completion of the transaction.

7. The distributed microservices system of claim 6, wherein the provisioning request is for a transaction that spans multiple microservices of the plurality of microservices.

8. The distributed microservices system of claim 6, wherein the monolith includes the service broker temporarily managing the data of each of the plurality of microservices.

9. The distributed microservices system of claim 6, wherein the service broker includes a library in each microservice, configured to redirect the provisioning request to a local service broker.

10. The distributed microservices system of claim 6, wherein the service broker is a global service broker for all of the plurality of microservices in the distributed microservice system.

11. A method for implementing a service broker that is an orchestration layer for transactions in a distributed microservice system, and the method comprising:

receiving a provisioning request in the distributed microservice system, wherein the provisioning request is redirected to the service broker, wherein the distributed microservice system includes a plurality of microservices each managing its own data such that there is no central configuration store for the plurality of microservices, wherein the provisioning request is a first request for a transaction, and wherein subsequent requests for the transaction are managed internally by the service broker, and managing the plurality of microservices by the service broker as a monolith in context of the provisioning request to perform detecting, validating, and one of committing and canceling changes in the distributed microservice system due to the provisioning request, constructing a temporary monolithic database of data in respective microservices for the managing; and destroying the temporary monolithic database subsequent to completion of the transaction.

12. The method of claim 11, wherein the provisioning request is for a transaction that spans multiple microservices of the plurality of microservices.

13. The method of claim 11, wherein the monolith includes the service broker temporarily managing the data of each of the plurality of microservices.

14. The method of claim 11, wherein the service broker includes a library in each microservice, configured to redirect the provisioning request to a local service broker.

15. The method of claim 11, wherein the service broker is a global service broker for all of the plurality of microservices in the distributed microservice system.

* * * * *